(12) United States Patent
Miyamori et al.

(10) Patent No.: US 8,330,609 B2
(45) Date of Patent: Dec. 11, 2012

(54) PASSENGER DETECTION SYSTEM

(75) Inventors: Masahiro Miyamori, Yokohama (JP);
Satoshi Baba, Kawasaki (JP); Shinji Kato, Yokohama (JP); Shinya Deguchi, Yokohama (JP); Shusuke Hayashida, Yokohama (JP)

(73) Assignee: Honda Elesys Co., Ltd., Yokohama (JP)

( * ) Notice: Subject to any disclaimer, the term of this patent is extended or adjusted under 35 U.S.C. 154(b) by 307 days.

(21) Appl. No.: 12/751,412

(22) Filed: Mar. 31, 2010

(65) Prior Publication Data

US 2011/0074567 A1    Mar. 31, 2011

(30) Foreign Application Priority Data

Sep. 28, 2009 (JP) ................. P2009-222723

(51) Int. Cl.
*G08B 21/00* (2006.01)
(52) U.S. Cl. ...... 340/667; 340/457.1; 340/9.1; 324/658; 324/660; 324/661; 280/801.1
(58) Field of Classification Search .............. 340/457.1, 340/457, 561, 506–509, 517–525, 538–538.17, 340/9.1–9.17, 635, 657, 666, 665, 664, 667, 340/3.5, 3.54, 12.32, 13.37; 280/801.1
See application file for complete search history.

(56) References Cited

U.S. PATENT DOCUMENTS

| | | | |
|---|---|---|---|
| 6,144,367 A * | 11/2000 | Berstis ........................ | 345/158 |
| 6,556,137 B1 * | 4/2003 | Oka et al. ..................... | 340/561 |
| 2006/0164254 A1 * | 7/2006 | Kamizono et al. ............ | 340/667 |
| 2007/0194900 A1 * | 8/2007 | Hawkins et al. ........... | 340/457.1 |
| 2009/0219039 A1 * | 9/2009 | Fasshauer ..................... | 324/682 |

(Continued)

FOREIGN PATENT DOCUMENTS

JP    11-011256 A    1/1999

(Continued)

OTHER PUBLICATIONS

Japanese Language Office Action dated Jul. 21, 2011.

*Primary Examiner* — George Bugg
*Assistant Examiner* — Sharmin Akhter
(74) *Attorney, Agent, or Firm* — Arent Fox LLP (57) ABSTRACT

A passenger detection system includes a satellite sensor circuit; and a master determination unit. The satellite sensor circuit includes an antenna electrode which is provided in at least one of a seating face or a back face of a seat; and an electric field generation unit which generates an electric field around the antenna electrode, and generates a current signal based on the electric field. The master determination unit includes a current detection unit which detects a variation of the current signal; and a control unit which determines a sitting situation of a passenger by comparing signal data with threshold data, the signal data being related to a current signal which flows based on the electric field which is obtained from the current detection unit and which is generated at the antenna electrode, the threshold data being related to the sitting situation of the passenger. The satellite sensor circuit and the master determination unit are connected via a power supply line and a ground line. The electric field generation unit generates the electric field based on the voltage supplied from the master determination unit to the power supply line, and the electric field generation unit supplies the current signal to the power supply line.

9 Claims, 7 Drawing Sheets

U.S. PATENT DOCUMENTS

2010/0171515 A1* 7/2010 Nakagawa et al. ........... 324/658
2011/0248819 A1* 10/2011 Saito et al. .................... 340/5.64

FOREIGN PATENT DOCUMENTS

| JP | 3458323 A | 1/1999 |
| JP | 2000-071931 A | 3/2000 |
| JP | 3779069 A | 3/2000 |
| JP | 2001-124860 A | 5/2001 |
| JP | 2004-268719 A | 9/2004 |

* cited by examiner

PASSENGER DETECTION SYSTEM

BACKGROUND OF THE INVENTION

1. Field of the Invention

The present invention relates to a passenger detection system, especially relates to a passenger detection system which may optionally perform a seat belt reminder function of reminding a passenger to fasten their seat belt, based on a seat-sitting situation of whether every passenger is sitting on their car seat.

Priority is claimed on Japanese Patent Application No. 2009-222723, filed Sep. 28, 2009, the contents of which are incorporated herein by reference.

2. Description of Related Art

A seat belt device is provided on a car seat, so that the passenger is fastened to their seat by a seat belt to hold the passenger in the seat even when the car rapidly slows down due to a collision. To avoid that a passenger is not wearing the seat belt, a seat belt non-wearing alarm device or a seat belt reminder system can be used. The seat belt reminder system notifies that a passenger is not wearing their seat belt. The notification may be given by either a visual alarm which acts on the passenger's visual sense by lighting a lamp, or an audio alarm which acts on the passenger's acoustic sense by loud buzzing. In Japan, on Sep. 1, 2005, the rules that a driver must obey were enforced. Under the rules, a car manufacturer must install a seat belt reminder system in their car. The seat belt reminder system will alarm and remind a driver or passenger to fasten their seat belt when the driver's seat belt is unfastened.

The seat belt reminder system generates an alarming sound to remind a passenger to fasten their seat belt. The generation of an alarming sound is made based on first and second types of information. The first type of information indicates that a passenger is sitting in their seat. The second type of information indicates that a buckle switch of the seat is OFF.

A detection system to perform passenger detection may be classified into first and second detection systems. The first detection system uses a weight sensor or a piezoelectric sensor both of which determine the weight of a passenger. The second detection system uses a capacity sensor which measures the body-size of a passenger or the surface area of a passenger.

Figure 7A:
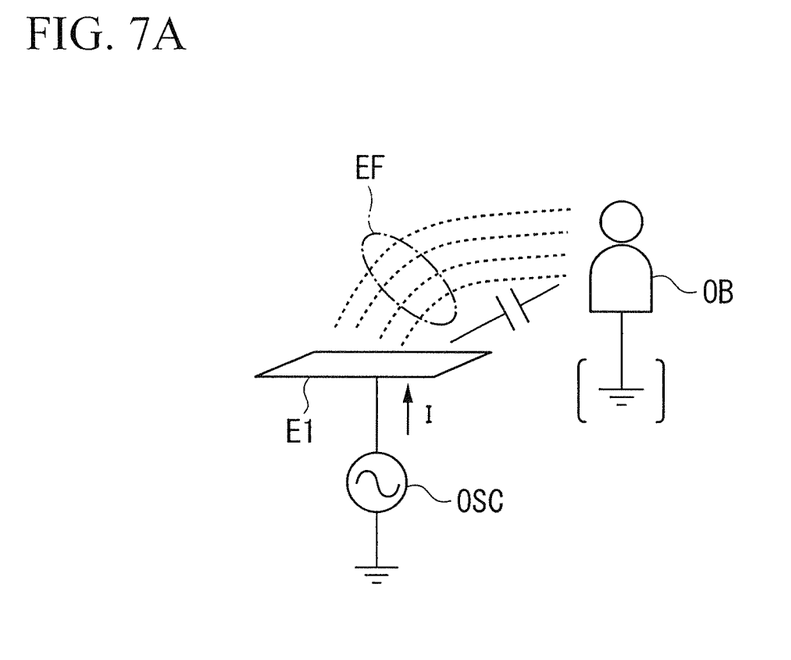
FIG. 7A is a schematic diagram to explain the basic principles of the passenger detection device according to the prior art.

FIG. 7A is a schematic diagram illustrating the principles of the passenger detection system which uses the detection system with the capacity sensor. In this detection system, a weak electric field (EF) is generated at an antenna electrode provided in the seat, such that electric charges are generated on the surfaces of the electrode and an object to be measured. A capacitive coupling is caused between the surface of the electrode and the surface of the object to be measured. Therefore, the detection system is able to measure variation of displacement current which depends on variation of a capacity. The capacity variation varies depending on the body-size of a passenger and the seat-sitting situation of the passenger.

As shown in FIG. 7A, a low voltage of a high frequency is generated by a sine wave oscillator OSC and applied to an antenna electrode E1, so that a weak electric field (EF) is generated around the antenna electrode E1, resulting in a displacement current I which flows on the side of the antenna electrode E1. The value of the displacement current I depends on the value of a static electric capacity which is caused between the antenna electrode E1 and an object OB. Therefore, the value of the displacement current I depends on the dielectric constant of the object OB to be measured. The object is placed near the antenna electrode E1. Therefore, the current which flows on the side of the antenna electrode E1 varies depending on weather the object OB to be measured is on the seat or not. By using this phenomenon, it is possible to detect the seat-sitting situation of whether a passenger is sitting in their seat or not. The detection is made based on a physical quantity such as displacement current obtained by the sensor.

Figure 7B:
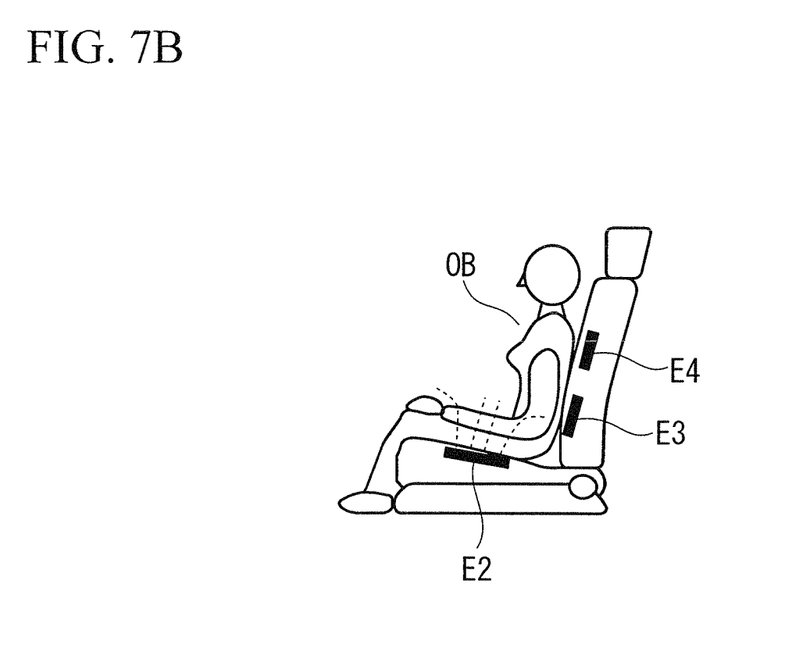
FIG. 7B is another schematic diagram to explain the basic principles of the passenger detection device according to the prior art.

As shown in FIG. 7B, a plurality of antenna electrodes are provided in the car. For example, the antenna electrode E2 is provided on the seating face of the seat, and the antenna electrodes E3 and E4 are provided on the back face of the seat. Therefore, it is possible to obtain many physical quantities about the object (passenger) to be measured on the seat, such that the seat-sitting situation of the passenger on the seat is appropriately detected.

For example, FIG. 1 of Japanese Patent No. 3779069 discloses a technique which a plurality of antenna electrodes are provided on the back face of the seat in predetermined period.

To use information obtained by the sensors as determination results which indicate whether the passenger is sitting on the seat or not, it is necessary to use a determination device which includes a control circuit. The control circuit regularly obtains data from the sensor, and compares a predetermined threshold with a physical quantity (a current value or a capacity measured value calculated from the current value) which is a measured result based on a weak electric field technique.

For example, FIG. 3 of Japanese Patent No. 3458323 discloses a technique of a passenger detection system. The passenger detection system lights an alarm lamp, based on the determination result which indicates whether the passenger is sitting on the seat or not and the determination result which indicates whether the passenger is wearing the seat belt or not.

SUMMARY OF THE INVENTION

However, in the prior art, to detect a displacement current of a sensor, it is necessary to distribute an antenna electrode driving line to each sensor, and the antenna electrode driving lines are connected to a determination circuit via a current-voltage conversion circuit. In addition, to reduce an affection of a stray capacitance for the antenna electrode driving line, each antenna electrode driving line is formed with a shield cable. For example, a sine wave generation circuit supplies an alternating current for capacity cancellation to the shield which surrounds a core wire (a center conductor). As described above, to appropriately detect the seat-sitting situation of the passenger on the seat, it is necessary to obtain information from a plurality of antenna electrodes. However, in this case, the number of the wires between the antenna electrode and the determination circuit is increased. Therefore, a problem in which the number of the wires is increased occurs.

From now on, if the seat which is used in the seat belt reminder system applies to a passenger seat, a left back seat, the problem of extensibility of the wires may be deepen. Therefore, it may be necessary to connect between the antenna and the determination circuit with fewer wires.

An object of the present invention is to provide a passenger detection system which requires less wires between an antenna electrode and a determination circuit.

(1) According to one aspect of the present invention, there is provided a passenger detection system includes: a satellite sensor circuit; and a master determination unit, the satellite sensor circuit comprising: an antenna electrode which is provided in at least one of a seating face or a back face of a seat; and an electric field generation unit which generates an electric field around the antenna electrode, and generates a current signal based on the electric field, the master determination unit comprising: a current detection unit which detects a variation of the current signal; and a control unit which determines a sitting situation of a passenger by comparing signal data with threshold data, the signal data being related to a current signal which flows based on the electric field which is obtained from the current detection unit and which is generated at the antenna electrode, the threshold data being related to the sitting situation of the passenger, wherein the satellite sensor circuit and the master determination unit are connected via a power supply line and a ground line, the electric field generation unit generates the electric field based on the voltage supplied from the master determination unit to the power supply line, and the electric field generation unit supplies the current signal to the power supply line.

(2) Moreover, in the above described passenger detection system, wherein the master determination unit includes a voltage modulation unit which generates a voltage to the power supply line in synchronous with a signal which indicates an address of the antenna electrode, the satellite sensor circuit includes a voltage level detection circuit which generates a selection signal which indicates a self-selection based on a voltage level supplied to the power supply line, the electric field generation unit includes a self-excited oscillation circuit which is connected to the power supply line when the selection signal is generated, and the self-excited oscillation circuit generates the electric field around the antenna electrode, and the self-excited oscillation circuit changes a cycle of the current signal which flows on the power supply line, the cycle being determined based on a first reference capacity (CH) and a second reference capacity (CL), the first reference capacity (CH) and the second reference capacity (CL) being previously set, the measured capacity (COB) varies depending on the sitting situation of the passenger and the electric field generated by the antenna electrode, the control unit determines the sitting situation of the passenger being sitting on the seat, based on the cycle of the current signal.

(3) Moreover, in the above described passenger detection system, wherein one cycle of the current signal is a sum of a charge time and a discharge time, the self-excited oscillation circuit charges the first reference capacity (CH) during the charge time, the self-excited oscillation circuit discharges the second reference capacity (CL) and a measured capacity (COB) during the discharge time, the measured capacity (COB) varies depending upon the sitting situation of the passenger, the control unit determines the sitting situation of the passenger being sitting on the seat, based on at least one of the one cycle or a ratio, the ratio being the one cycle of the charge time or the discharge time.

(4) Moreover, in the above described passenger detection system, wherein the electric field generation unit receives an input of a signal which indicates whether a seat belt is fastened or not, and changes an amplitude of the current signal based on a voltage level of the signal, the control unit determines whether the passenger who is sitting on the seat is wearing the seat belt or not, based on the amplitude of the current signal.

(5) Moreover, in the above described passenger detection system, wherein the control unit outputs a visual or audio alarm based on a first determination result and a second determination result, the first determination result is the determination on the sitting situation of the passenger, the second determination result is the determination on whether the seat belt is fastened or not.

(6) Moreover, in the above described passenger detection system, wherein the control unit places an airbag device in one of a first state allowing an airbag of the airbag device to inflate and a second state preventing the airbag from inflating, based on a determination result of the sitting situation of the passenger.

(7) Moreover, in the above described passenger detection system, wherein the power supply line and the ground line are insulated wires which includes a conductor and an insulator which covers the conductor.

(8) Moreover, in the above described passenger detection system, wherein the antenna electrode is formed by printing a conductive paint on the insulative film material.

(9) Moreover, in the above described passenger detection system, wherein the satellite sensor circuit and the antenna electrode are mounted on the insulative film material, and circuit components on the insulative film material are connected by a printing wire which is formed by the conductive paint.

EFFECT OF THE INVENTION

According to the passenger detection system of the present invention, if the number of the antenna electrode increases, the number of wires between the antenna electrode and the determination circuit does not increase. Therefore, it is possible to reduce the number of the wires between the antenna electrode and the determination circuit. Because the antenna electrode and the determination circuit are connected via two lines which are a power supply line and a ground line.

DESCRIPTION OF THE PREFERRED EMBODIMENTS

An embodiment of the present invention will be described below with reference to the drawings.

Figure 1:
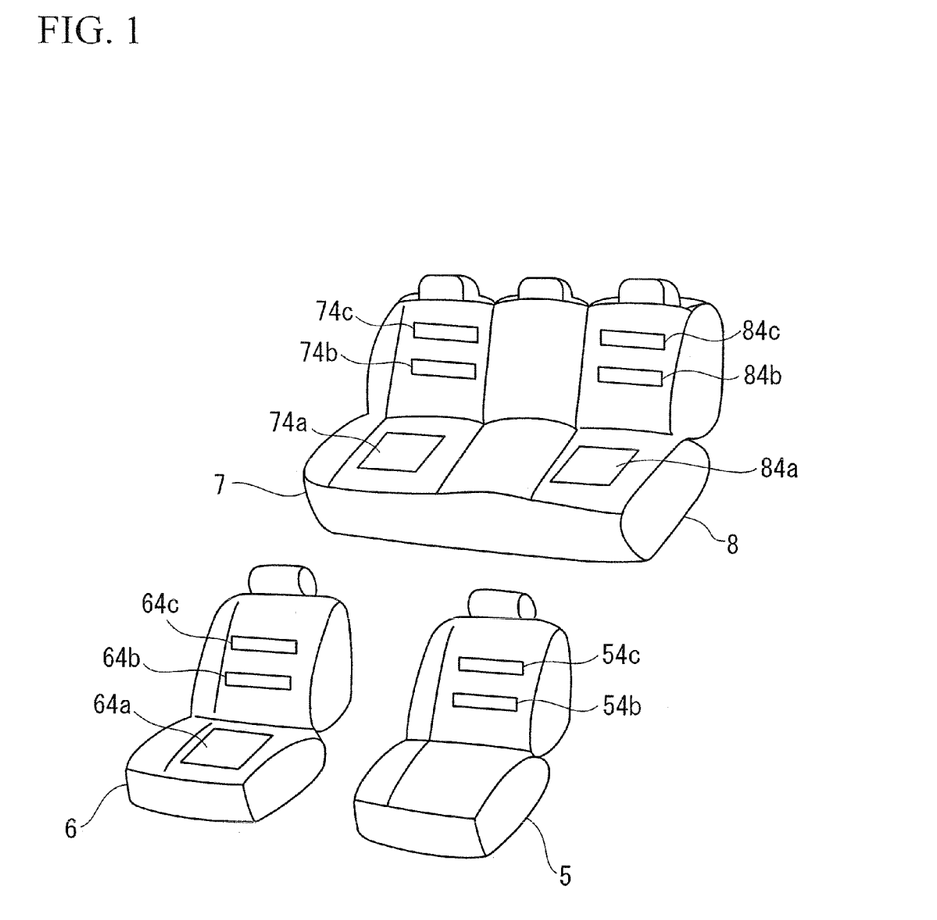
FIG. 1 is a schematic view illustrating a layout of seats with a passenger detection device according to an embodiment of the present invention.
Figure 2:
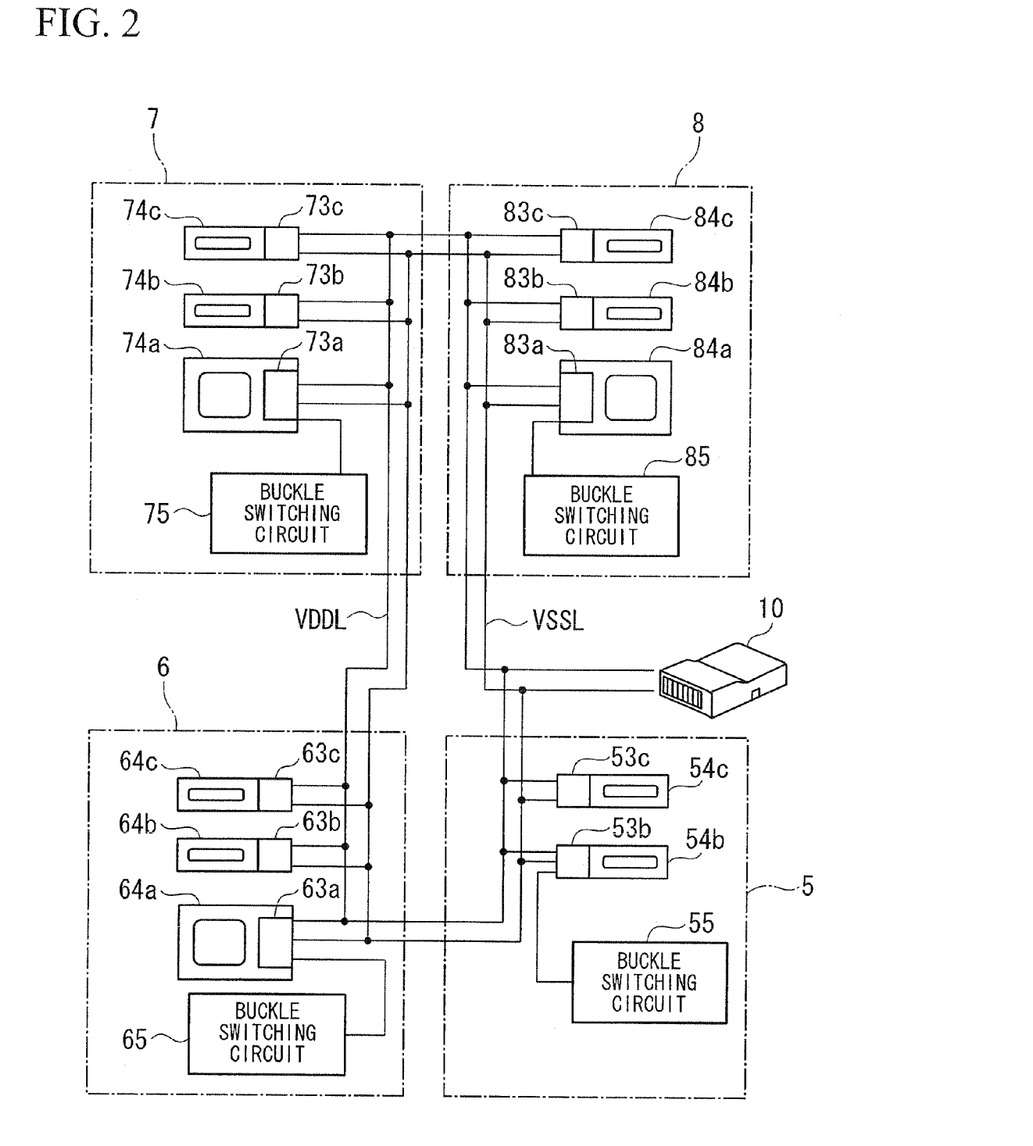
FIG. 2 is a schematic diagram illustrating a layout of antenna electrodes of the passenger detection device according to the embodiment of the present invention.

FIG. 1 and FIG. 2 are schematic diagrams illustrating layouts of seats and sensors of a passenger detection system according to the embodiment of the present invention. Hereinafter, as shown in FIG. 1, all seats of a car of the passenger detection system according to the embodiment of the present invention are a driving seat 5, a passenger seat 6, a right back seat 7 and a left back seat 8. A sensor 54b and a sensor 54c are provided on the back face of the driving seat 5. A sensor 64a is provided on the seating face of the passenger seat 6, and a sensor 64b and a sensor 64c are provided on the back face of the passenger seat 6. A sensor 74a is provided on the seating face of the right back seat 7, and a sensor 74b and a sensor 74c are provided on the back face of the right back seat 7. A sensor 84a is provided on the seating face of the left back seat 8, and a sensor 84b and a sensor 84c are provided on the back face of the left back seat 8. The sensors are made of a conductive cloth, a material which has textured narrow metal wires, or a conductor-printed film.

FIG. 2 illustrates interconnections among the sensors 54b to 54c, 64a to 64c, 74a to 74c and 84a to 84c shown in FIG. 1, satellite sensor circuits 53b to 53c, 63a to 63c, 73a to 73c and 83a to 83c, buckle switching circuits 55, 65, 75 and 85, and a master determination unit 10. The satellite sensor circuits 53b to 53c, 63a to 63c, 73a to 73c and 83a to 83c drive each of the sensors. The buckle switching circuits 55, 65, 75 and 85 are connected to each of the satellite sensor circuits 53b to 53c, 63a to 63c, 73a to 73c and 83a to 83c. The master determination unit 10 controls each of the satellite sensor circuits 53b to 53c, 63a to 63c, 73a to 73c and 83a to 83c. As shown in FIG. 2, the satellite sensor circuits 53b to 53c, 63a to 63c, 73a to 73c and 83a to 83c are mounted on a film material with sensors. In the film materials, a voltage level detection circuit 32, an electric field generation unit 34 and a modulation current switching circuit SW2 (circuit parts), which will be described later, are connected via printed wires of conductive paint.

For example, in FIG. 2, the master determination unit 10 is an airbag control device. As the master determination unit 10, a particular device such as an electric control device (ECU) may be used. The master determination unit 10 includes a control unit which determines whether the passenger is sitting on the seat or not, by comparing a signal data with a predetermined threshold data, the signal data being related to a current which flows in each antenna electrode, the threshold data being related to a sitting situation of the passenger.

The satellite sensor circuits 53b to 53c drive the sensors 54b to 54c which are each provided on the driving seat 5, and flow current to the antenna electrodes of the sensors. The satellite sensor circuits 63a to 63c are each provided corresponding to the sensors 64a to 64c which are provided on the passenger seat 6. The satellite sensor circuits 73a to 73c are each provided corresponding to the sensors 74a to 74c which are provided on the right back seat 7. The satellite sensor circuits 83a to 83c are each provided corresponding to the sensors 84a to 84c which are provided on the left back seat 8.

Here, the master determination unit 10 and each of the satellite sensor circuits are connected via two lines which are a power supply line VDDL and a ground line VSSL.

The buckle switching circuits 55 shown in FIG. 2 are connected to the satellite sensor circuit 53b of the driving seat 5. The buckle switching circuit 65 shown in FIG. 2 is connected to the satellite sensor circuit 63a of the passenger seat 6. The buckle switching circuit 75 shown in FIG. 2 is connected to the satellite sensor circuit 73a of the right back seat 7. The buckle switching circuit 85 shown in FIG. 2 is connected to the satellite sensor circuit 83a of the left back seat 8. The buckle switching circuit 55, 65, 75 and 85 supply the information, which indicates whether the buckle switch is in an ON-state or an OFF-state, to each of the satellite sensor circuits. In other words, the buckle switching circuit 55, 65, 75 and 85 supply a H-level signal or an L-level signal based on whether the passenger is wearing the seat belt or not.

Figure 3:
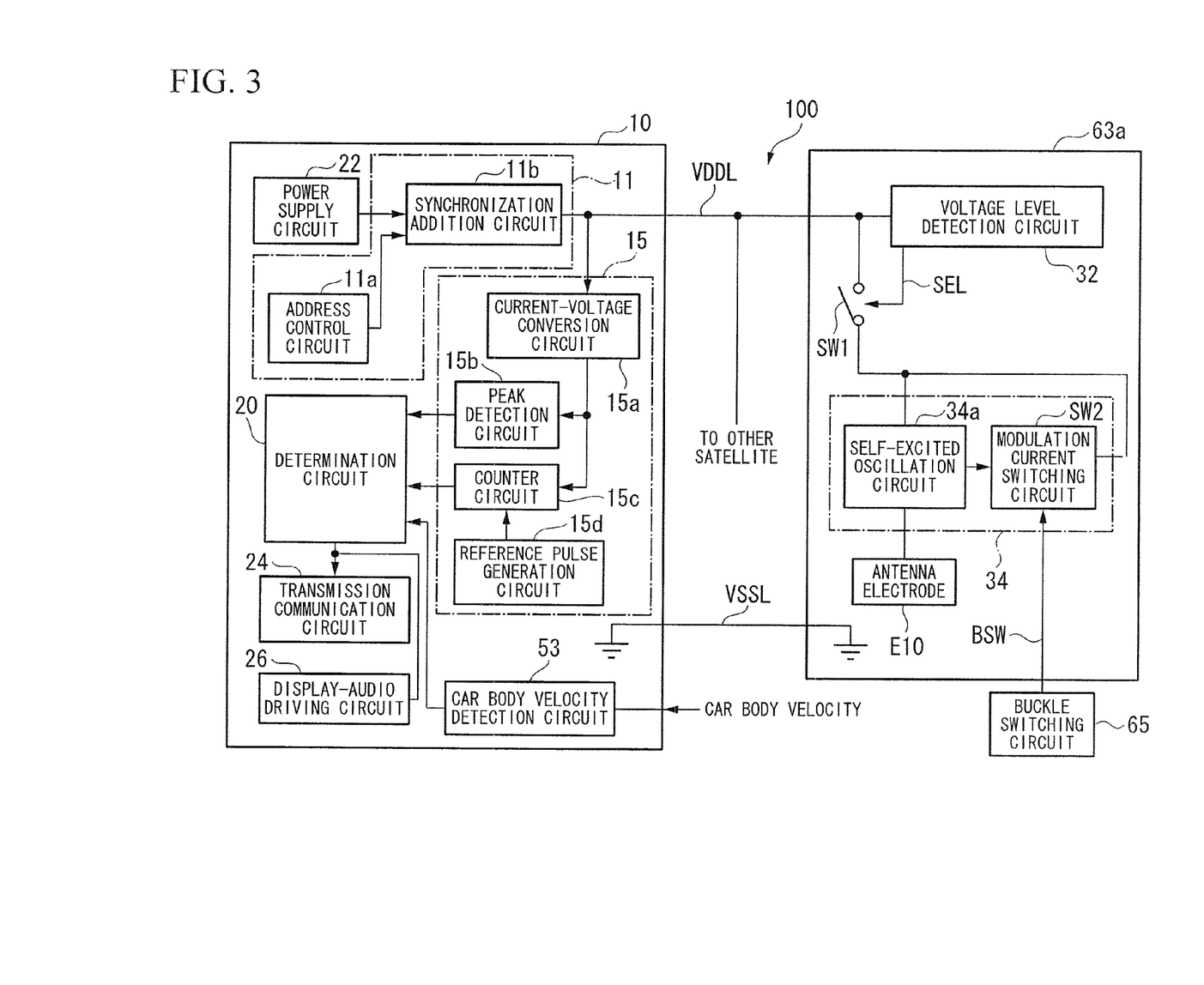
FIG. 3 is a block diagram of the configurations of the passenger detection device according to the embodiment of the present invention.

FIG. 3 is a circuit block diagram of the passenger detection system 100 according to the embodiment of the present invention. In FIG. 3, the master determination unit 10 shown in FIG. 2 and the satellite sensor circuit 63a shown in FIG. 2 of the passenger seat 6 are shown. In FIG. 3, a satellite sensor circuit other than the satellite sensor circuit 63a of the passenger seat 6 and a buckle switching circuit other than the buckle switching circuit 65 are not shown. However, as shown in FIG. 2, the circuits now shown are connected to the satellite sensor circuit 63a and the buckle switching circuit 65 like a ring shape via the power supply line VDDL and the ground line VSSL.

The master determination unit 10 sequentially selects the satellite sensor circuit 53b to 53c, 63a to 63c, 73a to 73c and 83a to 83c, to supply driving voltage of the power supply line VDDL which runs in the form of ring shape. The selected satellite sensor circuit drives a self-excited oscillation circuit 34a which is included in the selected satellite sensor circuit, and generates a weak electric field at the antenna electrode. The selected satellite circuit supplies displacement current (current signal) to the power supply line based on a cycle which is determined by a reference capacity (a first reference capacity CH, a second reference capacity CL) and a measured capacity COB. The first reference capacity CH and the second reference capacity CL are set in the self-excited oscillation circuit 34a. The measured capacity COB is varied based on a sitting situation of the passenger, and the measured capacity COB is varied based on a weak electric field generated by the antenna electrode. The master determination unit 10 detects the sitting situation of the passenger on the seat and the seat-belt-fastening situation of the seat belt of the seat, the detection being made based on the displacement current.

Firstly, the configuration of the master determination unit 10 is described. The master determination unit 10 includes a voltage modulation unit 11 (an address control circuit 11a and a synchronization addition circuit 11b), a current detection unit 15 (a current-voltage conversion circuit 15a, a peak detection circuit 15b, a counter circuit 15c and a reference pulse generation circuit 15d), a determination unit 20, a power supply circuit 22, a transmission communication circuit 24, a display-audio driving circuit 26 and a car body velocity detection circuit 53.

The voltage modulation unit 11 (the address control circuit 11a and the synchronization addition circuit 11b) supplies the driving voltage to the satellite sensor circuit 63a via the power supply line VDDL. The voltage modulation unit 11 includes the address control circuit 11a and the synchronization addition circuit 11b.

The address control circuit 11a is controlled by the determination circuit 20. The address control circuit 11a supplies signals (address control signals) to the synchronization addition circuit 11b, the signals indicating the assigned address corresponding to all sensors provided on the driver seat 5, the passenger seat 6, the right back seat 7 and the left back seat 8.

The synchronization addition circuit 11b adds a first voltage with a second voltage, and supplies the added first voltage to the power supply line VDDL. The first voltage is input from the power supply circuit 22. The first voltage is a power voltage which drives whole of the master determination unit 10. The second voltage is previously set synchronizing with an address control signal input from the address control circuit 11a. The second voltage is varied in each of the satellite sensor circuits. For example, the synchronization addition circuit 11b supplies 5.2 V to the satellite sensor circuit 53b in FIG. 2, supplies 5.4V to the satellite sensor circuit 53c in FIG. 2, and supplies 5.6 V to the satellite sensor circuit 63a in FIG. 2. In other words, the synchronization addition circuit 11b sequentially adds 0.2 V, 0.4V and 0.6 V which are previously determined based on the address signal, and the supplies the added power voltage to the power supply line VDDL. In other words, the satellite sensor circuits 53b to 53c, 63a to 63c, 73a to 73c and 83a to 83c have 1 to 11 as the addresses which indicate the positions, the synchronization addition circuit 11b supplies the sum of the additional voltage and 5V as the driving voltage, the additional voltage being multiplied the address with 0.2 V.

As described above, in the present embodiment, the synchronization addition circuit 11b adds the voltage, and supplies the added voltage to the power supply line VDDL. The satellite sensor circuit detects the voltage level, and determines whether the satellite sensor circuit is selected or not. However, the configuration is not limited to the aforementioned configuration. For example, for general communication technique uses, the master determination circuit may perform a data transmission of a plurality of bits (a start bit and an address bit) which includes a start bit via the power supply line VDDL, all satellite sensor circuits may receive the start bit, and the satellite sensor circuit, whose address accords with the address bit, and may determine that the satellite sensor circuit is selected. In this case, the synchronization addition circuit 11b supplies a fixed voltage (for example, 5 V) as the driving voltage, after transmitting a plurality of bits. In the present embodiment, as described above, the synchronization addition circuit 11b supplies different voltages for each of the satellite sensor circuits.

The current detection unit 15 (the current-voltage conversion circuit 15a, the peak detection circuit 15b, the counter circuit 15c and the reference pulse generation circuit 15d) is a circuit which detects the modulation current (current signal) which is supplied to the power supply line VDDL by the satellite sensor circuit 63a. The current detection unit 15 includes the current-voltage conversion circuit 15a, the peak detection circuit 15b, the counter circuit 15c and the reference pulse generation circuit 15d.

The current-voltage conversion circuit 15a converts the modulation current, which flows to the power supply line VDDL, to the signal data (pulse signal). The peak detection circuit 15b detects the peak voltage level from the pulse signal converted by the current-voltage conversion circuit 15a, and supplies the detected peak voltage level (peak voltage) to the determination circuit 20.

The counter circuit 15c counts state of a H-level or L-level during a predetermined period of a pulse signal converted by the current-voltage conversion circuit 15a (a period during the satellite sensor circuit 63a is driving) using a reference pulse input from the reference pulse generation circuit 15d, and the counter circuit 15c supplies the count result to the determination circuit 20.

The determination circuit 20 (the control unit) compares an input signal data (the output of the peak detection circuit 15b and the output of the counter circuit 15c) with previously set threshold, and the determination circuit 20 determines whether the passenger is sitting on the seat or not, and whether the passenger is wearing a seat belt or not. The determination by the determination circuit 20 will be described later.

The determination circuit 20 is connected to the transmission communication circuit 24, the display-audio driving circuit 26 and the car body velocity detection circuit 53.

The transmission communication circuit 24 receives a communication starting signal from the determination circuit 20, and the transmission communication circuit 24 communicates with the car body velocity detection circuit 53, the alarm lamp (not shown) and the alarm sound generator, based on the signal. The display-audio driving circuit 26 receives a driving starting signal from the determination circuit 20, and the display-audio driving circuit 26 notifies the passenger is not wearing a seat belt, by driving the alarm lamp and the alarm sound generator (not shown).

The determination circuit 20 is connected to the car body velocity detection circuit 53, and the determination circuit 20 captures a car body velocity. The determination circuit 20 determines whether the car body velocity is over a predetermined value or not. The determination is a first determination result. Then, the determination circuit 20 performs a comprehensive determination based on the first determination result and a second determination result. The second determination result indicates whether the passenger is wearing the seat belt or not. Then, the determination circuit 20 supplies the driving starting signal to the display-audio driving circuit 26. For example, the determination circuit 20 supplies the driving starting signal, which instructs the alarm lamp to light, to the display-audio driving circuit 26, when the car body velocity is under the predetermined value. In addition, the determination circuit 20 supplies the driving starting signal, which instructs the alarm sound to output, to the display-audio driving circuit 26, when the car body velocity is over the predetermined value. The display-audio driving circuit 26 notifies the passenger that the passenger is not wearing the seat belt, based on the driving starting signal, the notification being made by operating the alarm lamp device and the alarm sound generator (not shown).

The power supply circuit 22 supplies power to each of the circuits of the master determination unit 10.

Next, the circuit configuration of the satellite sensor circuit 63a is described. The satellite sensor circuit 63a includes the voltage level detection circuit 32, the electric field generation unit 34 (the self-excited oscillation circuit 34a and the modulation current switching circuit SW2), the antenna electrode E10, and the switching circuit SW1.

The voltage level detection circuit 32 detects a voltage level which is supplied to the power supply line VDDL by the master determination unit 10, and the voltage level detection circuit 32 determines whether the satellite sensor circuit 63a, to which the voltage level detection circuit 32 belongs, is selected or not. For example, in the voltage level detection circuit 32 of the satellite sensor circuit 63a, a lower limit is set to 5.5 V, an upper limit is set to 5.7, to distinguish the satellite sensor circuit 63a from other satellite sensor circuits. For example, the voltage level detection circuit 32 determines that the voltage level detection circuit 32 is selected, when the master determination unit 10 supplies 5.5 V to the power supply line VDDL. In addition, in the voltage level detection circuit 32 of another satellite sensor circuit, each of different thresholds is set. Therefore, while one satellite sensor circuit is selected, another satellite sensor circuit is not selected.

The voltage level detection circuit 32 supplies a selection signal SEL to the switching circuit SW1, when the satellite sensor circuit 63a, to which the voltage level detection circuit 32 belongs, is selected. Then, the voltage level detection circuit 32 connects the power supply line VDDL and the electric field generation unit 34, such that the electric field generation unit 34 drives.

The electric field generation unit 34 (the self-excited oscillation circuit 34a and the modulation current switching circuit SW2) generates a weak electric field around the electrode (the antenna electrode E10) of a sensor provided in the satellite sensor circuit 63a. The electric filed generation unit 34 includes the self-excited oscillation circuit 34a and the modulation current switching circuit SW2.

The satellite sensor circuit 63a is connected to the buckle switching circuit 65. The buckle switching circuit 65 is provided in each of the seats (here, the passenger seat 6), and the buckle switching circuit 65 supplies, to the modulation current switching circuit SW2, a selection signal BSW of the H-level, when the passenger is wearing the seat belt. In addition, the buckle switching circuit 65 supplies, to the modulation current switching circuit SW2, a selection signal BSW of the L-level, when the passenger is not wearing the seat belt.

Figure 4:
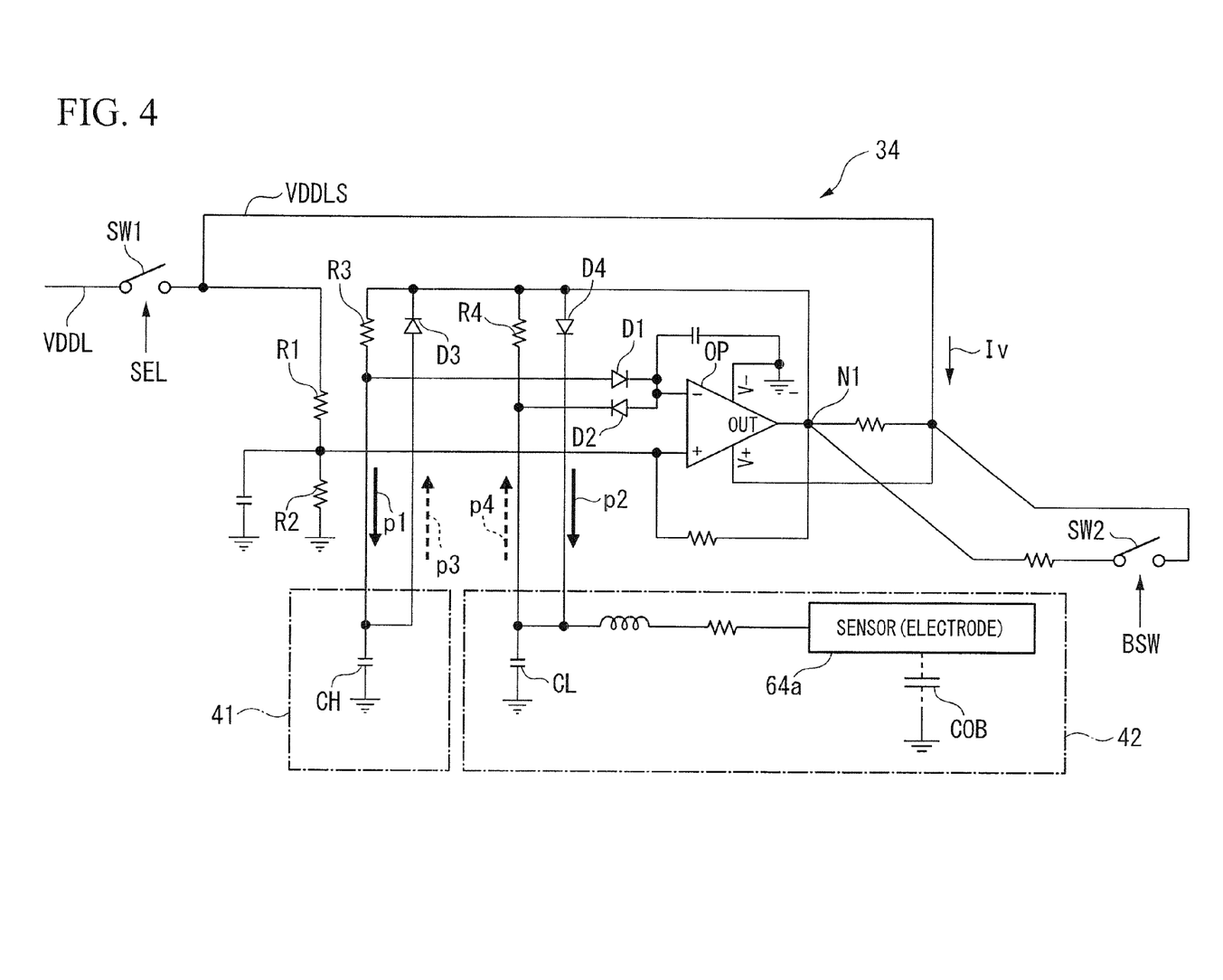
FIG. 4 is a circuit diagram illustrating an electric field generation unit included in the passenger detection device according to the embodiment of the present invention.

FIG. 4 is a circuit diagram illustrating the concrete circuit configuration of the electric field generation unit 34. The electric field generation unit 34 includes a self-excited oscillation circuit and the modulation current switching circuit SW2. The self-excited oscillation circuit includes one operational amplifier OP and a plurality of resistors, diodes and capacities. In addition, in FIG. 4, the aforementioned switching circuit SW1 and the sensor 64a are also shown.

In FIG. 4, a TH time definition unit 41 is connected to an inverse input terminal (−) of the operational amplifier OP via a diode D1. A TL time definition unit 42 is connected to an inverse input terminal (−) of the operational amplifier OP via the diode D2. The capacity which is included in the TH time definition unit 41 is a first reference capacity CH. As described later, the charge time of a self-excited oscillation circuit is determined based on the first reference capacity CH. The capacity which is included in the TL time definition unit 42 is a second reference capacity CL. As described later, the discharge time of a self-excited oscillation circuit is determined based on the measured capacity COB and the second reference capacity CL. The measured capacity COB is connected to the second reference capacity CL via the sensor 64a.

Next, the operation of the satellite sensor circuit 63a is described with reference to FIG. 5 which shows a relationship between the absorption current of the operational amplifier (the modulation current Iv in FIG. 4) and time.

In FIG. 4, when the satellite sensor circuit 63a is selected, the selection signal SEL becomes the H-level. Then, the power supply line VDDL and the power supply line VDDS of the electric field generation unit 34 are connected. Then, the self-excited oscillation circuit, which includes the operational amplifier OP, starts an oscillation operation.

The normal input terminal (+) of the operational amplifier receives a voltage that is obtained by dividing the voltage level of the inner power supply line VDDLS with the resistor R1 and the resistor R2. For example, by setting the resistor value of the resistor R1 to the same resistor value of the resistor R2, the normal input terminal (+) receives a voltage level which is a half of the voltage level of the inner power supply line VDDLS. The voltage level the normal input terminal (+) receives is a threshold voltage of the operational amplifier OP. The output node N1 of the operational amplifier OP is set to the H-level (here, 5.6 V), because the power of the operational amplifier OP is connected to the inner power supply line VDDLS, and the inverse input terminal (−) has not yet been charged up to the threshold voltage of the operational amplifier.

Figure 5:
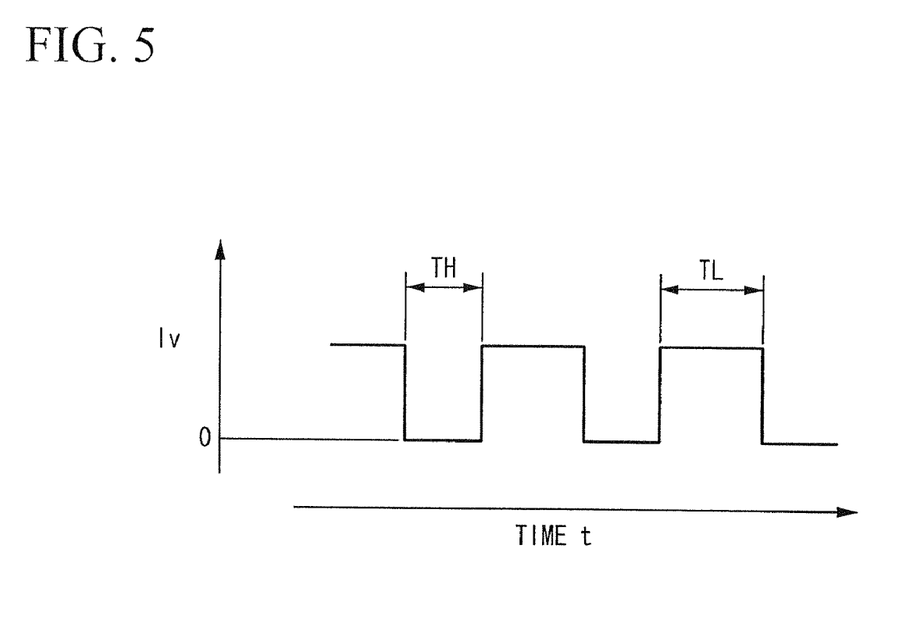
FIG. 5 is a current waveform to explain the operation of the electric field generation circuit of FIG. 4.

The time period of TH shown in FIG. 5 is a time period that the first reference capacity CH of the TH time definition unit 41 shown in FIG. 4 is charged via the node N1 to the resistor R3 (in other words, the time definition unit 41 is charged via a route p1 shown FIG. 4). In this case, the second reference capacity CL of the TL time definition unit 42 and the measured capacity COB between the antenna electrode of the sensor 64a and the ground are also charged by the diode D4. The measured capacity COB is an electrostatic capacity which is occurred between the antenna electrode of the sensor 64a and the ground. The electrostatic capacity takes a different value based on the situation, because the electrostatic capacity depends on the seat situation (whether the passenger sitting on the seat is an adult or a child, or the seat is vacant). For example, the measured capacity COB of a "child" is larger than the measured capacity COB of a "vacant seat", and the measured capacity COB of an "adult" is larger than the measured capacity COB of a "child".

In this case, the second reference capacity CL and the measured capacity COB of the TL time definition unit 42 are charged via the node N1, the resistor R4 and the diode D4. In other words the second reference capacity CL and the measured capacity COB are charged via the route p2 shown in FIG. 4. Therefore, the charge time of the second reference capacity CL and the measured capacity COB is shorter than the charge time of the first reference capacity CH. Then, the charge time is determined based on the first reference capacity CH of the TH time definition unit 41.

During the charge time (the time period TH shown in FIG. 5), the voltage of the inverse input terminal (−) of the operational amplifier OP is measured via the diode D1. Until the voltage of the inverse input terminal is over the threshold (the voltage of the normal input terminal) of the operational amplifier, the output node N1 of the operational amplifier OP is at the H-level, and the modulation current Iv does not flow. If the voltage level of the inverse input terminal (−) of the operational amplifier is over the threshold, the charge time transits to the discharge time (time period of TL).

During the discharge time (the time period of TL shown in FIG. 5), the routes p3 and p4 shown in FIG. 4 are discharge routes. The discharge route p3 from the first reference capacity CH is formed by the resistor R3 and the diode D3, and the discharge route p4 from the second reference capacity CL and the measured capacity COB is only formed by the resistor R4. In this case, the discharge time is determined based on the second reference capacity CL and the measured capacity COB. Therefore, the time period of TL shown in FIG. 5 is determined by the second reference capacity CL and the measured capacity COB of the TL time definition unit 42. As described above, the measured capacity COB varies based on the situation of the object to be measured who is sitting on the seat, therefore, the TL time period varies in response to the object to be measured. Specifically, the time TL of "child" is longer than the time TL of a "vacant seat", and the time TL of an "adult" is longer than the time TL of a "child".

In other words, the electric field generation unit 34 of the satellite sensor circuit 63a generates a weak electric field around the antenna electrode of the sensor 64a. However, the measured capacity COB varies in response to the sitting situation of the seat, then, the electric charge which is discharged varies, therefore, the discharge time (the time period of TL) varies. In the cycle of the displacement current Iv (the current signal), the time period TH is nearly constant, however, the time period TL varies in response to the sitting situation. The whole cycle (the sum during the time period TH and the time period TL) of the displacement current Iv (the current signal) varies in response to the sitting situation of the seat.

During the discharge time (time period TL shown in FIG. 5), the voltage of the inverse input terminal (−) of the operational amplifier OP is measured via the diode D2. Until the voltage of the inverse input terminal becomes lower than the threshold (the voltage of the normal input terminal) of the operational amplifier, the output node N1 of the operational amplifier OP is at the L-level, and the modulation current Iv keeps flowing. During the discharge time, when the voltage level of the inverse input terminal (−) of the operational amplifier OP becomes lower than the threshold of the operational amplifier, the operation mode enters into the charge mode again (the time period TH).

As described above, the self-excited oscillation circuit 34a continues the oscillating operation with the aforementioned cycle, during the time period that the self-excited oscillation circuit 34a receives the voltage from the master determination unit 10 via the power supply line VDDL.

In FIG. 4, the modulation current switching circuit SW2 receives the selection signal BSW from the buckle switching circuit 65. When the passenger is wearing the seat belt, the modulation current switching circuit SW2 receives H-level of the selection signal BSW, and the modulation current switching circuit SW2 lessens the resistance value between the output node N1 of the operational amplifier OP and the inner power supply line VDDLS. When the passenger is not wearing the seat belt, the modulation current switching circuit SW2 receives L-level, of the selection signal BSW, and the modulation current switching circuit SW2 increases the resistance value between the output node N1 of the operational amplifier OP and the inner power supply line VDDLS.

In other words, the modulation current switching circuit SW2 increases the absolute value of the modulation current Iv based on whether the passenger is wearing the seat belt or not, such that the first absolute value is larger than the second absolute value. The first absolute value represents a state in which the passenger is wearing the seat belt. The second absolute value represents a state in which the passenger is not wearing the seat belt. Therefore, the amplitude of the displacement current Iv (the current signal) varies based on whether the passenger is wearing the seat belt or not.

As described above, the satellite sensor circuit 63a flows the modulation current Iv on the power supply line VDDL during the predetermined time period (the time period TL), in response to the capacity sum. The capacity sum is the sum of the second reference capacity CL and the measured capacity COB which varies based on whether the passenger is sitting on the seat or not. With regard to the modulation current Iv, the time period, that the current level is large, is determined based on the sitting situation of the seat. The absolute value of the modulation current I during the time period TL varies based on whether the passenger is wearing the seat belt or not.

In conclusion, one cycle of the modulation current Iv (the current signal) is the sum of the charge time and the discharge time. The charge time is when the self-excited oscillation circuit 34a charges the first reference capacity CH. The discharge time is when the self-excited oscillation circuit 34a discharges the second reference capacity CL and the measured capacity COB. The measured capacity COB varies based on whether the passenger is sitting on the seat or not. The amplitude of the modulation current Iv (the current signal) varies based on whether the passenger is wearing the seat belt or not. In addition, the master determination unit 10 determines whether the passenger is sitting on the seat or not, and determines whether the passenger sitting on the seat is wearing the seat belt or not. The determination is made based on the aforementioned cycle and the amplitude.

The aforementioned description is about the schematic configuration of the passenger detection system shown in FIG. 3. The passenger detection system, which includes the aforementioned configurations, runs as described below. Firstly, the address control circuit 11a in the voltage modulation unit 11 of the master determination unit 10 supplies an address control signal under the control of the determination circuit 20. The address control signal indicates which satellite sensor circuits are selected. The synchronization addition circuit 11b adds the output voltage of the power supply circuit 22 with the predetermined voltage in synchronous with the address control signal, and the synchronization addition circuit 11b supplies the voltage to the power supply line VDDL. In addition, the time period in which the satellite sensor circuit is selected, is previously set by the determination circuit 20. Each of the satellite sensor circuit is selected in sequential order.

Next, the voltage level detection circuit 32 of each of the satellite sensor circuit 63 determines whether the sensor of the voltage level detection circuit 32 is selected or not, based on the set threshold voltage. When the voltage level detection circuit 32 determines that the sensor of the voltage level detection circuit 32 is selected, the voltage level detection circuit 32 supplies the selection signal SEL, and connects the voltage level detection circuit 32 and the electric field generation unit 34 both of which are included in the same unit. In addition, the self-excited oscillation circuit 34a of the electric field generation unit 34 generates a weak electric field around the antenna electrode E10. With regard to the weak electric field, the time (cycle) of the modulation current Iv, which flows on the power supply line VDDL by the self-excited oscillation circuit 34a, varies based on whether the passenger is sitting on the seat or not, or based on a type of the passenger. In addition, the absolute value (the amplitude) of the modulation current Iv varies, based on whether the passenger in the seat is wearing the seat belt or not. The modulation current is detected by the current detection unit 15 via the power supply line VDDL. Then, the modulation current is converted to voltage by the current-voltage conversion circuit 15a. Then, the modulation current is supplied to the peak detection circuit 15b and the counter circuit 15c.

Figure 6:
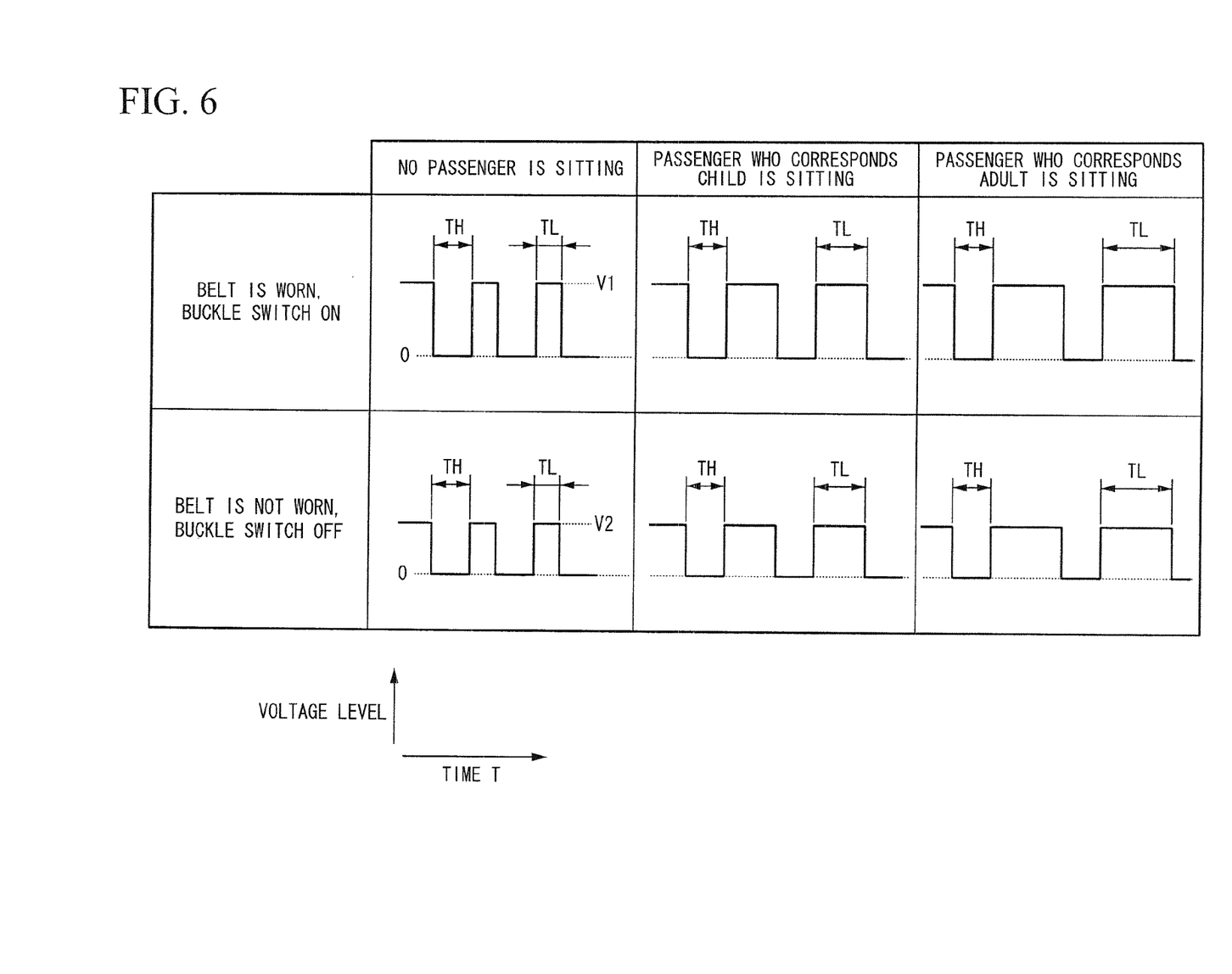
FIG. 6 is a chart of voltage waveforms to explain the determination process by performed by a determination circuit of the passenger detection device according to the embodiment of the present invention.

Next, the operations performed by the peak detection circuit 15b and the counter circuit 15c are described, with reference to FIG. 6. In FIG. 6 is a schematic diagram illustrating the variation of the voltage converted from the modulation current by the current-voltage conversion circuit 15a. In FIG. 6, time is on the horizontal axis, and voltage level is on the vertical axis. In the present embodiment, as shown in FIG. 6, the current-voltage conversion circuit 15a converts the current to voltage. Therefore, if the modulation current Iv is 0, the voltage level is 0 V, and if the modulation current flows, the voltage level becomes a positive value. In FIG. 6, the variations of the voltage level in the first case, the second case and the third case are shown. The first case indicates that the seat is vacant (no passenger is sitting on the seat). The second case indicates that a child is sitting on the seat. The third case indicates that an adult is sitting on the seat. The variations of the voltage level depending on whether the passenger is wearing the seat belt or not in the first case to the third case are shown in the upper and lower parts of FIG. 6.

In the first case to the third case, the measured capacity COB of the antenna electrode E10 of the satellite sensor circuit 63a varies. However, the time period TH in which the L-level is taken is nearly constant, and the time period TL in which the H-level is taken varies. Specifically, as shown in FIG. 6, increasing the capacity between a vacant seat, a child or an adult and the measured capacity COB increases the time period TL. If the passenger is wearing the seat belt, the maximum voltage level value (here, the voltage level V1) becomes large. If the passenger is not wearing the seat belt, the maximum voltage level value (here, the voltage level V2) becomes small.

The peak detection circuit 15b detects the voltage level of V1 and V2, and supplies the voltage level (signal data) to the determination circuit 20.

The counter circuit 15c counts the length of the time period (the time period TL) that the voltage level is at the H-level, based on the pulse of the reference pulse generation circuit 15d. Specifically, a constant time period is used as the whole time period. The constant time period is shorter than the time period in which one satellite sensor circuit is selected. During the whole time period, the reference pulse generation circuit 15d generates a predetermined number of pulses (the total pulse number is referred to as CTA). The counter circuit 15c is counting the number of pulses (the variable pulse number is referred to as CTL) during all the time periods TL when the voltage level is H-level, provided that the total pulse number is CTA.

The counter circuit 15c supplies the total pulse number CTA and the variable pulse number CTL (signal data) to the determination circuit 20.

In the determination circuit 20, the threshold is previously set corresponding to the pulse number input from the counter circuit 15c, in response to possible situations of the seat that can be presumed. The determination circuit 20 compares and determines the threshold and the input pulse number. As described above, in the first case (in which the seat is vacant), the second case (in which a child is sitting on the seat) and the third case (in which an adult is sitting on the seat), the variable pulse number CTL in the second case is larger than the variable pulse number CTL in the first case, and the variable pulse number CTL in the third case is larger than the variable pulse number CTL in the second case. Therefore, the thresholds are set such that it is possible to determine if the seat is vacant, a child is sitting on the seat, or an adult is sitting on the seat. For example, the thresholds of pulse number are set to th1 and th2. Therefore, if the pulse number is smaller than the threshold th1, the determination unit 20 determines that the seat is vacant. Then, if the pulse number is smaller than the threshold th2 and is greater than the threshold th1, the determination unit 20 determines that a child is sitting on the seat. Then, if the pulse number is greater than the threshold th2, the determination unit 20 determines that an adult is sitting on the seat.

In addition, environmental variations such as temperature variations will cause variations of the operation frequency of the self-excited oscillation circuit. Compensations to such environmental variations can be made by using a ratio of the time period TH to the time period TL for determination. For example, the pulse number corresponding to the time period TH becomes "the total pulse number CTA−the variable pulse number CTL". Therefore, "the total pulse number CTA−the variable pulse number CTL" may be divided by the variable pulse number CTL, and "(CTA/CTL)−1" may be used as a determination value. In this case, it is possible to determine the seat situation, by previously setting the thresholds in response to possible situations that can be presumed.

In the aforementioned description, the threshold is set and a determination is performed, for one sensor. In the present embodiment in which a plurality of sensors are provided in one seat, the threshold may be set for each of the seat for the sum of a plurality of signal data (pulse number) obtained from a plurality of sensors, and whether a passenger is sitting in the seat or not can be determined. In addition, the thresholds may be set for the sum of the first signal data and the second signal data. The first signal data is for an antenna electrode (here, the sensor 64a) is provided on the surface of the seat, and the second signal data is for antenna electrodes (here, the sensors 64b and 64c). In this case, positional distributions of child passengers and adult passengers who are sitting in seats can be obtained by experiments. The positional distributions can be drawn over a two-dimensional coordination system. The two-dimensional coordination system has an X-axis and a Y-axis. First signal data presents that the passenger is sitting on the seating face of the seat. The first signal data is plotted on the X-axis. Second signal data presents that the passenger is contacting on the back face of the seat. The total sum of the second signal data is plotted on the Y-axis. A two-dimensional approximation curve is obtained, which bounds the positional distributions of child passengers and adult passengers. The two-dimensional approximation curve provides thresholds between the positional distributions of child passengers and adult passengers. In addition, a two-dimensional approximation curve may be drawn between first and second areas. The first area is an area having a distribution of child passengers. The distribution of child passengers is a distribution of positions at which the child passenger contacts the surfaces of the seat when they are sitting in the seats. The second area is another area having another distribution of adult passengers. The distribution of adult passengers is a distribution of positions at which the adult passenger contacts the surfaces of the seat when they are sitting in the seats. In addition, the sitting situation may be determined for each of the seat, using a plurality of sensor information of a plurality of dimensions. For example, in the present embodiment, the passenger seat and back seats each include three sensors. Therefore, the sitting situation may be determined in three dimensions. In addition, to obtain a more accurate sitting situation, one seat may include more than four sensors, and the sitting situation may be determined in four dimensions.

In addition, in the present embodiment, the cycle (the sum during the time period TH and the time period TL) of the self-excited oscillation circuit 34a is measured by using the reference pulse generation circuit 15d and the counter circuit 15c, when the measured capacity COB varies. Then, the cycle of the self-excited oscillation circuit 34a is used for the determination of the sitting situation. The frequency variation of the self-excited oscillation circuit 34a may be directly measured. For example, the determination circuit 20 may directly count the number of the output pulses of the current-voltage conversion circuit 15a during the time period that one satellite sensor circuit is selected. Then, the counted number of the output pulses may be used as the signal data of the determination. In this case, the thresholds for determination are previously set, based on experiment data which presents whether "the seat is vacant", "a child is sitting on the seat" and "an adult is sitting on the seat". In addition, to compensate for the aforementioned environment variation, the self-excited oscillation circuit 34a may be configured to be connectable or unconnectable to the TL time definition unit 42. The self-excited oscillation circuit 34a may obtain the count number in the first state which is the non-connection state (non-load state), and may obtain the count number in the second state (real measuring state) where the measured capacity COB is present. The latter count number may be divided by the former count number, by switching the aforementioned two calculations.

In the determination circuit 20, the thresholds are previously set based on whether the passenger is wearing the seat belt of the seat or not. The thresholds correspond to the voltage levels V1 and V2 of the signal input from the peak detection circuit 15b. As described above, if the passenger is wearing the seat belt, the voltage level of the signal input from the peak detection circuit 15b is the voltage level V1. Then, if the passenger is not wearing the seat belt, the voltage level of the signal input from the peak detection circuit 15b is the voltage level V2. In the present embodiment, the values of V1/V2 varies in each of the satellite sensor circuit, because different voltage is supplied to each of the satellite sensor circuit, based on the address control signal from the address control circuit 11a controlled by the determination circuit 20. Therefore, it is possible to determine whether the passenger is wearing the seat belt or not, by setting a half level "(V1+V2)/2" between V1 and V2 to the threshold Vth of the determination circuit 20. In other words, the determination can be made based on the voltage dependency on the threshold voltage Vth for each of the satellite circuits. In addition, when the peak detection circuit 15b detects the voltage converted by the current-voltage conversion circuit 15a, V1 and V2 may be converted to constant voltage values V1$f$ and V2$f$, and the threshold Vth of the determination circuit 20 may be set to "(V1$f$+V2$f$)/2". In this case, it is unnecessary that the threshold voltage has a voltage dependency.

In each case, if the voltage level of the signal input from the peak detection circuit 15b is smaller than Vth, the determination circuit 20 determines that the passenger is not wearing the seat belt. Then, if the voltage level of the signal input from the peak detection circuit 15b is greater than the Vth, the determination circuit 20 determines that the passenger is wearing the seat belt.

In addition, with regard to the threshold which is used in a passenger determination, the value of the count number is determined based on the cycle of the self-excited oscillation circuit 34a. Therefore, it is unnecessary that the threshold has a dependency, the dependency corresponding to an operation voltage of each of the satellite sensor circuit. The threshold may be set based on the seat situation which can be presumed.

In other words, the determination circuit 20 determines whether the passenger is sitting on the seat or not, and determines whether the passenger is wearing the seat belt or not, based on data such as the count number and the signal data which are input from the current detection unit 15.

If the determination circuit 20 determines that the passenger is sitting on the seat and determines that the passenger is not wearing the seat belt, the determination circuit 20 drives the alarm lamp and the alarm sound generator by controlling the transmission communication circuit 24 and the display-audio driving circuit 26, and notifies the passenger that the passenger is not wearing the seat belt. In this case, the determination circuit 20 compares a car body velocity and a setting value. The car body velocity is obtained by the car body velocity detection circuit 53, and the setting value is previously set. Then, the determination circuit 20 determines that the alarm lamp or the alarm sound generator is driven. For example, if the car body velocity is smaller than the setting value, the determination circuit 20 lights the alarm lamp. Then, if the car body velocity is greater than the setting value, the determination circuit 20 generates an alarm sound.

In addition, if the passenger is wearing the seat belt, and if the car body velocity is smaller than the setting value, the determination circuit 20 does not light the alarm lamp. If the car body velocity is greater than the setting value, the determination circuit 20 does not generate the alarm sound. In addition, if the passenger is not sitting on the seat, the determination circuit 20 does not consider the car body velocity, and does not drive the alarm lamp or the alarm sound generator. If an article or an object is placed on the passenger seat, the detecting device determines that any passenger is not setting in the seat because a measured capacity of an "article" or an "object" is smaller than a measured capacity of a "human", the former capacity being formed between the antenna electrode and the article or the object, the latter capacity being formed between the antenna electrode and human. In addition, a current to be detected by the current detecting circuit is distinctively smaller than that when the passenger is sitting in the seat.

Next, the process flow of the passenger detection system is described below. In the process flow of the passenger detection system, an "initialize" step is performed. Then, an "initial diagnosis" step is performed. Next, a "signal detection" step is performed. Then, the "passenger determination" step is performed.

Firstly, if an ignition switch is set to ON, the process starts. In the "initialize" step, the master determination unit 10 including the determination circuit 20 is initialized. Then, the "initial diagnosis" step is performed. The determination circuit 20 and the alarm lamp and the alarm sound generator included in the communication system are initialized in the "initial diagnosis" step. In the "signal detection" step, each of the satellite sensor circuit 63a is supplied with the power supply line VDDL. The modulation current on the power supply line VDDL is detected by the current detecting unit 15, so that the voltage conversion is performed by the current detecting unit 15. The converted voltage (pulse signal) is processed as the data signal (the voltage value and the count value), by the peak detection circuit 15b and the counter circuit 15c.

Then, in the "passenger determination" step, the determination circuit 20 compares the obtained signal data with the threshold data which is previously stored in the determination circuit 20, determines whether the passenger is sitting on the seat or not, and determines whether the passenger is wearing the seat belt or not when the passenger is sitting on the seat. Then, the determination circuit 20 performs a comprehensive determination based on the car body velocity obtained from the car body velocity detection circuit 53, and drives the alarm lamp and the alarm sound generator based on the determination result. When the "passenger determination" step is finished, the "signal detection" step is performed again, and the aforementioned processes are repeated.

In the passenger detection system according to the embodiment of the present invention, the antenna electrode and the determination circuit 20 are connected via two lines (the power supply line VDDL and the ground line VSSL). Therefore, if the number of the antenna electrodes increases, the number of wires which are connected to the determination circuit 20 does not increase. Therefore, it is possible to reduce the number of wires which connect the antenna electrode and the determination circuit 20. In addition, in the passenger detection system according to the embodiment of the present invention, it is unnecessary to use an expensive shield line between the determination circuit and the antenna electrode, as in the prior art. Therefore, the power supply line VDDL and the ground line VSSL are connected to each other via an inexpensive insulative wire which includes a conductor coated with an insulator. This can provide an inexpensive passenger detection system. In addition, the electric field generation unit 34 generates a weak electric field based on the voltage supplied from the master determination unit 10 to the power supply line VDDL. Therefore, it is unnecessary to provide a power supply to each of the satellite sensor circuits 63a, and it is possible to minimize and simplifies the satellite sensor circuit 63a.

The embodiments of the present invention have been described in detail above with reference to the drawings; however, the specific structure of the invention is not limited to the embodiment and other designs and the like are also included insofar as they do not depart from the spirit or scope of the invention. For example, the number of the antenna electrodes of the seat may be properly increased or decreased, and the shape of the antenna electrode may be rectangular- or band shaped.

The current detection unit 15 may be one which detects a current which directly flows in the antenna electrode. In addition, the current detection unit 15 may be a current detection circuit which indirectly detects a current, based on voltage and a wave-form which relate to a current. In the "passenger determination" step, the determination circuit 20 performs comparing the threshold data previously stored in the determination circuit 20 with signal data which relates to the current which flows in the antenna electrode. In addition, in the "passenger determination" step, the determination circuit 20 may store data such as the passenger's seat-sitting pattern on the seat by the passenger or the attitude of the passenger who is sitting in the seat, determine whether the passenger is sitting on the seat or not, and determine whether the passenger is an adult or a child based on this data. In the passenger detection system according to the embodiment of the present invention, the determination circuit 20 determines whether the passenger is sitting on the seat or not. Therefore, it is possible to use the determination result as control information which places an airbag device in either of a first state allowing an airbag of the airbag device to inflate or a second state preventing the airbag from inflating. Therefore, the passenger detection system according to the embodiment of the present invention may be used in a car which has a front airbag device and a side airbag device for each seat in the car.

What is claimed is:

1. A passenger detection system comprising:
a satellite sensor circuit; and
a master determination unit,
the satellite sensor circuit comprising:
an antenna electrode which is provided in at least one of a seating face or a back face of a seat; and
an electric field generation unit which generates an electric field around the antenna electrode, and generates a current signal based on the electric field,
the master determination unit comprising:
a current detection unit which detects a variation of the current signal; and
a control unit which determines a sitting situation of a passenger by comparing signal data with threshold data, the signal data being related to a current signal which flows based on the electric field which is obtained from the current detection unit and which is generated at the antenna electrode, the threshold data being related to the sitting situation of the passenger,
wherein the satellite sensor circuit and the master determination unit are connected via a power supply line and a ground line,
the electric field generation unit generates the electric field based on the voltage supplied from the master determination unit to the power supply line, and the electric field generation unit supplies the current signal to the power supply line.

2. The passenger detection system according to claim 1, wherein
the master determination unit comprises a voltage modulation unit which generates a voltage to the power supply line in synchronous with a signal which indicates an address of the antenna electrode,
the satellite sensor circuit comprises a voltage level detection circuit which generates a selection signal which indicates a self-selection based on a voltage level supplied to the power supply line,
the electric field generation unit comprises a self-excited oscillation circuit which is connected to the power supply line when the selection signal is generated, and the self-excited oscillation circuit generates the electric field around the antenna electrode, and the self-excited oscillation circuit changes a cycle of the current signal which flows on the power supply line, the cycle being determined based on a first reference capacity and a second reference capacity, the first reference capacity and the second reference capacity being previously set, the measured capacity varies depending on the sitting situation of the passenger and the electric field generated by the antenna electrode,
the control unit determines the sitting situation of the passenger being sitting on the seat, based on the cycle of the current signal.

3. The passenger detection system according to claim 2, wherein
one cycle of the current signal is a sum of a charge time and a discharge time, the self-excited oscillation circuit charges the first reference capacity during the charge time, the self-excited oscillation circuit discharges the second reference capacity and the measured capacity during the discharge time, the measured capacity varies depending upon the sitting situation of the passenger,
the control unit determines the sitting situation of the passenger being sitting on the seat, based on at least one of the one cycle or a ratio, the ratio being the one cycle of the charge time over the discharge time.

4. The passenger detection system according to claim 1, wherein
the electric field generation unit receives an input of a signal which indicates whether a seat belt is fastened or not, and changes an amplitude of the current signal based on a voltage level of the signal,
the control unit determines whether the passenger who is sitting on the seat is wearing the seat belt or not, based on the amplitude of the current signal.

5. The passenger detection system according to claim 4, wherein
the control unit outputs a visual or audio alarm based on a first determination result and a second determination result, the first determination result is the determination on the sitting situation of the passenger, the second determination result is the determination on whether the seat belt is fastened or not.

6. The passenger detection system according to claim 1, wherein
the control unit places an airbag device in one of a first state allowing an airbag of the airbag device to inflate and a second state preventing the airbag from inflating, based on a determination result of the sitting situation of the passenger.

7. The passenger detection system according to claim 1, wherein
the power supply line and the ground line are insulated wires which comprise a conductor and an insulator which covers the conductor.

8. The passenger detection system according to claim 1, wherein
the antenna electrode is formed by printing a conductive paint on an insulative film material.

9. The passenger detection system according to claim 8, wherein
the satellite sensor circuit and the antenna electrode are mounted on the insulative film material, and
circuit components on the insulative film material are connected by a printing wire which is formed by the conductive paint.

* * * * *